Oct. 24, 1967     M. M. WINDSOR ETAL     3,348,439
ARBOR DRIVE
Filed July 19, 1965
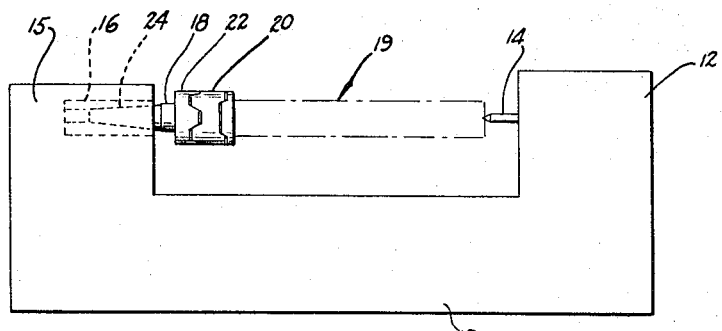
FIG. 1
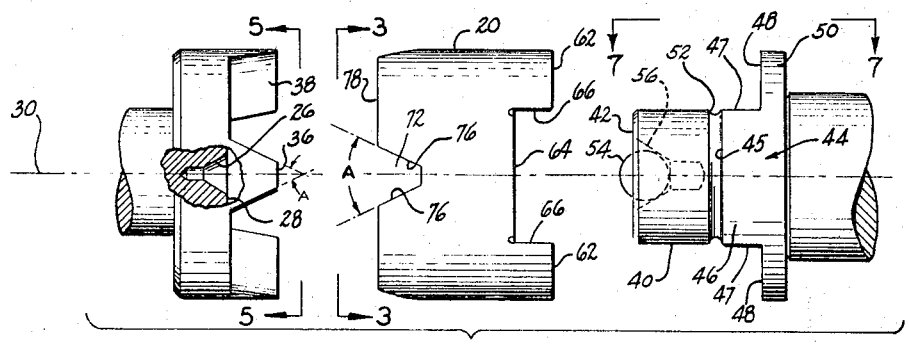
FIG. 2
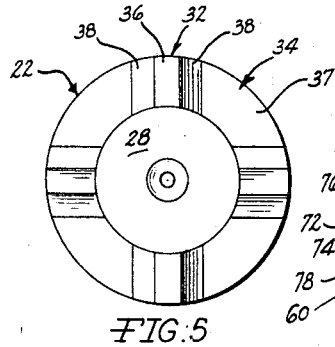
FIG. 5
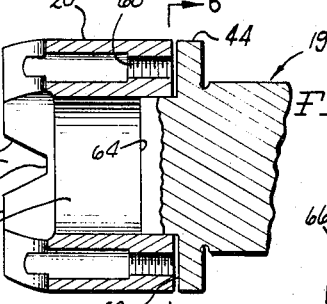
FIG. 4
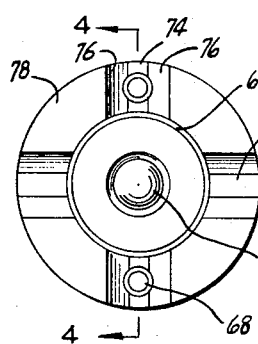
FIG. 3
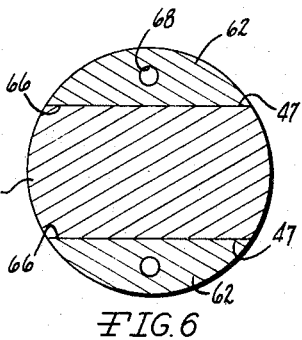
FIG. 6
FIG. 7
INVENTORS
MEREDITH M. WINDSOR
CHARLES A. WEBER
BY Olsen and Stephenson
ATTORNEYS United States Patent Office 3,348,439
Patented Oct. 24, 1967

3,348,439
ARBOR DRIVE
Meredith M. Windsor, Detroit, and Charles A. Weber, Livonia, Mich., assignors to Star Cutter Company, Farmington, Mich., a corporation of Michigan
Filed July 19, 1965, Ser. No. 473,026
1 Claim. (Cl. 82—40)

ABSTRACT OF THE DISCLOSURE

An arbor drive assembly interposed between a live center and an arbor and consisting of a driving head and a tubular collar press fit on the arbor. The driving head has a series of teeth arranged in a circular formation about the arbor axis and firmly engaged in notches in the collar, with the teeth and notches being provided with inclined side faces which readily mesh.

---

This invention relates to driving and centering devices for an arbor which is held in a machine for rotation during a cutting operation or the like.

With work rotating machines, such as a lathe, "lathe dogs" have been used to apply a drive force from the live spindle to the arbor. The dog is fastened on the arbor and engages in a slot on a driving head which in turn is driven by a live spindle. "Lathe dogs" are subject to several disadvantages since the drive force is applied to the arbor unevenly by a single driving connection. This has a tendency to apply a bending moment to the arbor, wear the live center out-of-round, and wear the dog and the slot in which the dog engages.

The objects of the present invention are to provide an arbor drive that is constructed simply and economically yet is rugged and not subject to excessive wear; that evenly distributes driving torque to the arbor; that reduces out-of-round wear on the locating center; and that facilitates simple, rapid and accurate assembly of an arbor on a live center.

Other objects, features and advantages of the present invention will become apparent in connection with the following description, claim, and drawings in which:

FIGURE 1 schematically illustrates a lathe on which is mounted the arbor drive of this invention;

FIGURE 2 is an exploded view of the arbor drive of this invention with a portion of a live center broken away to show a center hole which registers with a ball on an arbor;

FIGURE 3 is an end view of a collar on the arbor and is taken on line 3—3 of FIG. 2;

FIGURE 4 is a fragmentary longitudinal section taken on line 4—4 of FIG. 3 with the end of the arbor broken away to further illustrate the construction of the collar;

FIGURE 5 is an end view of the live spindle taken on line 5—5 of FIG. 2;

FIGURE 6 is a transverse cross section taken on line 6—6 of FIG. 4; and

FIGURE 7 is a fragmentary view of the arbor with the collar removed and is taken on line 7—7 of FIG. 2.

Referring to the drawings, a lathe bed 10 has at one end a conventional tailstock 12 which carries a dead center 14 and at the other end a conventional headstock 15 including a live spindle 16 which carries a live center 18. An arbor 19 is rotatably supported between center 14 and center 18. Arbor 19 has a collar 20 fastened on one end, the left end as viewed in FIG. 1 which is drivingly interengaged with a driving head 22 on center 18.

More particularly, center 18 comprises a tapered shank 24 fastened in spindle 16 in a conventional manner. At the other end of center 18 is a center hole 26 which projects inwardly from an end face 28 and is disposed along a rotational axis 30 (FIG. 2) of spindle 16 and center 14. Head 22 is fashioned with four teeth 32 which project in a direction axially outwardly from the face 28 toward tailstock 12. Teeth 32 are disposed generally radially of the center hole 26 and concentrically with the axis 30, and are equally spaced at ninety degrees circumferentially around head 22. Four notches 34 are also formed on head 22 between adjacent ones of the teeth 32. Each tooth 32 has a flat crown 36 and two flat side faces 38 inclined downwardly and rearwardly from crown 36, diverging in a direction axially away from the collar 20. The notches 34 have flat radial bottom faces 37.

Arbor 19 has an end portion 40 of circular cross section which extends axially from a flat end face 42 and terminates at a radial flange 44. Flange 44 has two flat faces 45 extending radially outwardly from arbor portion 40 in opposite radial directions. A first axial portion 46 of flange 44 is fashioned with diametrically opposite flats 47 so the flange portion 46 has an acircular cross section. Flats 47 extend axially of arbor 19 from faces 45 and terminate at flat radial faces 48 on a second flange portion 50. Flange portion 50 has a circular transverse cross section. The juncture between arbor portion 40 and flange portion 46 is relieved by a circumferential groove 52 to facilitate a press fit between arbor 19 and collar 20. An indexing ball 54 mounted in a center hole 56 at the end face 42 registers with the center hole 26 to align center 18 and arbor 19 along axis 30. Collar 20 has an axial bore 60 and is notched at one end to form a pair of axially projecting lugs 62 and a pair of recessed flat radial faces 64. Each lug 62 has a flat face 66 oppositely directed to the face 66 on the other lug. The diameters of bore 60 and arbor portion 40 together with the dimensions between faces 66 and between flats 47 are chosen that collar 20 is secured on arbor 19 by a press fit. Faces 64 on the collar 20 bottom on faces 45 of the flange 44 when collar 20 is fastened in place. Extending axially through collar 20 at each lug 62 is a threaded bore 68 arranged to receive a set screw which bears against face 48 and facilitates removal of collar 20 from the arbor 19.

Although the arbor drive has been described as including a collar fastened on an arbor by a press fit, it is to be understood that notches and teeth corresponding to notches 72 and teeth 78 could be formed directly at one end of an arbor.

At the other end of collar 20 are four notches 72 concentric with ball 54 and equally spaced at ninety degrees circumferentially around bore 60. Each of the notches 72 has a flat bottom face 74 and two side faces 76 inclined outwardly from bottom 74 and diverging in a direction axially toward center 18. Axially projecting teeth 78 are formed in the space between notches 72 circumferentially of collar 20. Teeth 32 on the live spindle 18 are arranged to align precisely with the notches 72 on collar 20 to facilitate rapid alignment of ball 54 with center hole 26 as teeth 32 move into notches 72. When ball 54 seats firmly in the center hole 26, the side faces 38 on each of the teeth 32 abut side faces 76 of a respective notch 72 to establish a tight driving connection. The dimensions and particularly the inclination of teeth 32, 78 and notches 34, 72 are chosen so that the side faces 38 on each of the teeth 32 engage side faces 76 of a respective notch 72 before the crowns of the teeth engage the bottom of the notches to assure the tight connection between head 22 and collar 20. The inclination of teeth 32, 78 and notches 34, 72 is also chosen to achieve simple and rapid piloting of balls 54 into hole 26. An included angle A between faces 38 on teeth 32 and between faces 76 of notches 72 of fifty degrees is preferred.

With a suitable workpiece (not shown) fastened on arbor 19, when collar 20 is nested with the head 22 teeth 32 and notches 72 pilot ball 54 into the center hole 26. Arbor 19 is secured in place by means of center 14. When spindle 16 rotates, torque is transmitted from the head 32 to the collar 20 through one of the side faces 38 on each of the four teeth 32 and one of the side faces 76 on each of the four notches 72 to apply driving torque evenly to arbor 19.

It will be understood that the arbor drive which is herein disclosed and described is presented for purposes of explanation and illustration and is not intended to indicate limits of the invention, the scope of which is defined by the following claim.

What is claimed is:

An arbor drive assembly for transmitting rotational drive forces from a live center to an arbor, said assembly comprising a tubular collar press fit on one end of said arbor in a coaxial relation therewith, said collar having one end thereof formed with axially extending notches having inwardly converging side faces and flat bottom faces which are concentric with the axis of said collar, a driving head on said spindle having axially projecting teeth provided with outwardly converging side faces and flat crowns, said teeth being concentric with said collar axis and being positioned in said notches so that said teeth side faces are in firm engagement with said notch side faces and said teeth crowns are spaced from said notch bottom walls, whereby rotational movement of said head is transmitted directly through said teeth and notches to said collar.

References Cited

UNITED STATES PATENTS 1,046,525  12/1912  Willett _____ 82—40 X

FOREIGN PATENTS 705,978   5/1941   Germany.
823,559  12/1951   Germany.
816,519   7/1959   Great Britain.

WILLIAM W. DYER, JR., *Primary Examiner.*

LEONIDAS VLACHOS, *Examiner.*